Dec. 23, 1969   P. J. BENIER   3,485,187
DOUGH DIVIDING MACHINE
Filed Aug. 25, 1967   2 Sheets-Sheet 2
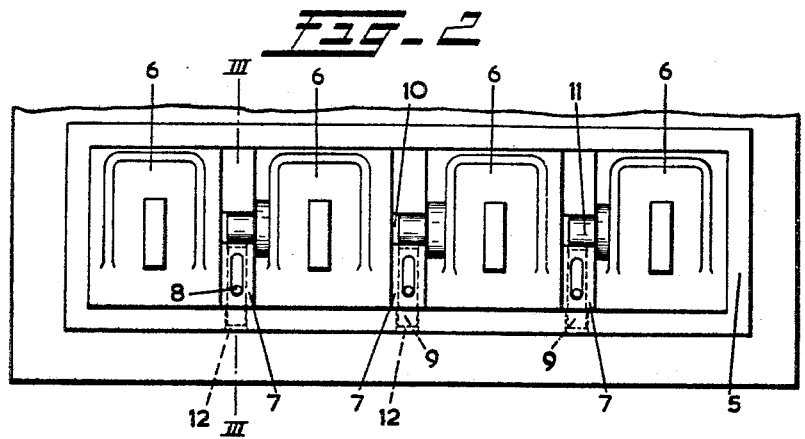
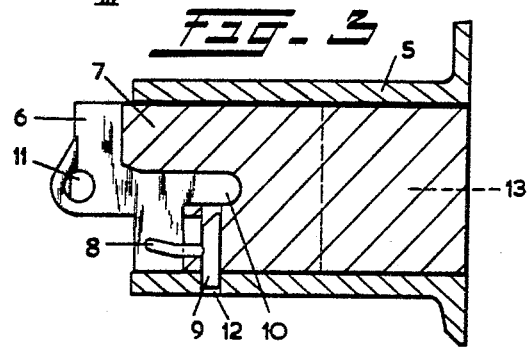
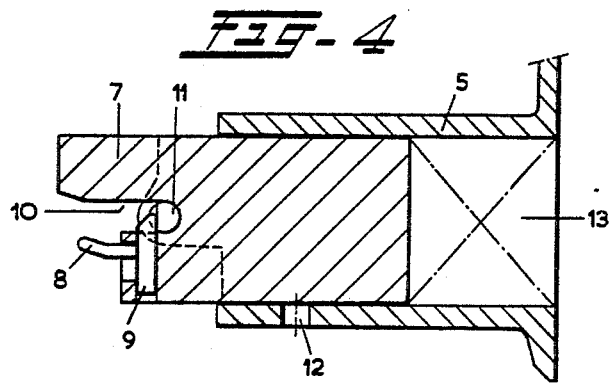
Pieter Johannes Benier,
INVENTOR.
BY Wendroth, Lind
and Ponack, Attorneys ered Dec. 23, 1969

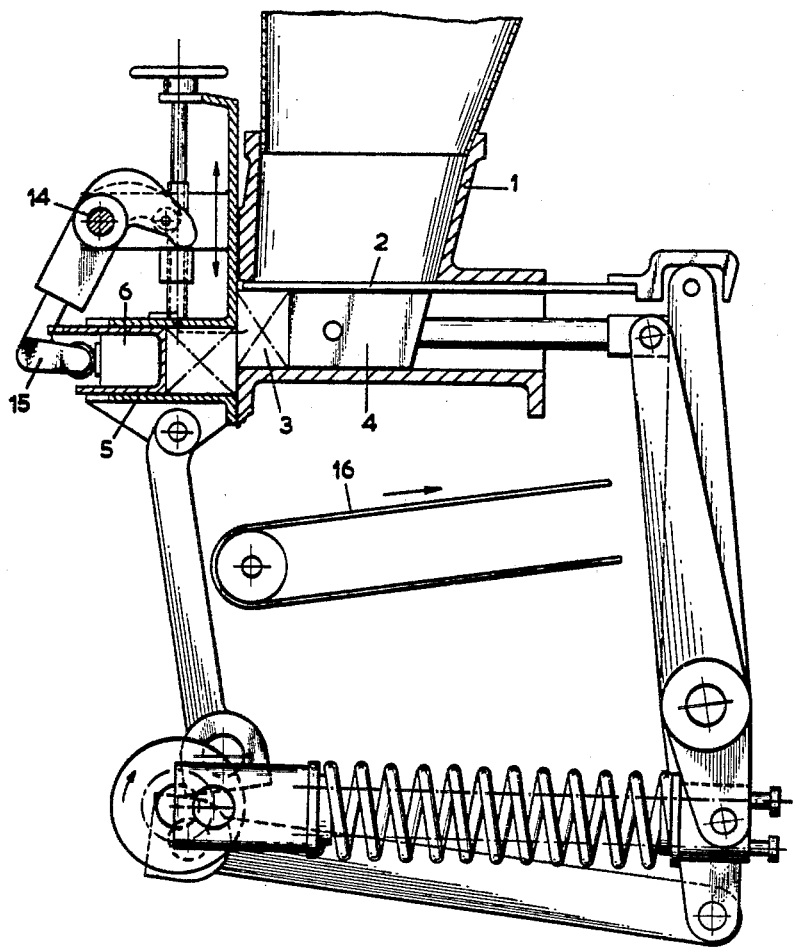

3,485,187
DOUGH DIVIDING MACHINE
Pieter Johannes Benier, Voorburg, South Holland, Netherlands, assignor to N.V. Nederlandsche Fabriek van Bakkerijwerktuigen voorheen G. J. Benier, The Hague, Netherlands, a corporation of the Netherlands
Filed Aug. 25, 1967, Ser. No. 663,411
Claims priority, application Netherlands, Aug. 29, 1966, 6612146
Int. Cl. A21c 5/02
U.S. Cl. 107—15                                       3 Claims

ABSTRACT OF THE DISCLOSURE

A dough dividing machine having a measuring chamber subdivided by partition walls into a plurality of compartments, each equipped with a reciprocating piston having an adjustable end position, said compartments being of adjustable size by said partition walls being either fixed to the measuring chamber or coupled to an adjacent piston to join in the reciprocating motion of the latter.

---

This invention relates to a dough dividing machine, particularly for bread bakeries, said machine comprising a measuring chamber subdivided by partition walls into a plurality of measuring compartments, each provided with a piston reciprocating therein for expelling from such measuring compartment the quantities of dough measured therein.

Such a dividing machine, which is known from Netherlands patent specification No. 45,968, can only be used for dividing dough always into the same portions.

In order to satisfy the need of dividing dough, at choice, into larger or smaller portions with the same machine, it has already been proposed to equip the measuring chamber of the dividing machine with removable separating walls, or with walls which can be displaced breadthwise of the chamber, and with sets of pistons adapted to each possible subdivision of the measuring chamber. Such dividing machines are expensive, however, owing to the necessity of stocking a number of sets of pistons, and moreover have the disadvantage that the change of the division of the measuring chamber into measuring compartments is time-consuming and cumbersome.

It is an object of the present invention to obviate the disadvantages of a dough dividing machine of the latter type by means of an improved construction of the same.

To that effect, the dough dividing machine according to the invention is characterized in that the or each partition wall is movable in the same direction as the pistons and can be fixed in the measuring chamber in a given position. In this connection the or each partition wall may be arranged to be coupled to an adjacent piston.

In illustration of the invention, one embodiment of the dough dividing machine will be described, by way of example, with reference to the accompanying drawings, in which:

FIG. 1 is a diagrammatic vertical section of the essential parts of the dividing machine;

FIG. 2 is a diagrammatic rear view of the measuring chamber with pistons and partition walls;

FIG. 3 is a section on the line III—III in FIG. 2 with retracted pistons and partition walls fixed in operative position; and FIG. 4 is a section similar to FIG. 3, in the position with retracted pistons and partition walls.

Referring to FIG. 1, the dough dividing machine comprises a dough funnel 1, the bottom end of which is separated, by a reciprocating blade 2, from a dough chamber 3, having a reciprocating plunger 4. In registry with the open end of the dough chamber 3, is a measuring chamber 5, which is of the same size in cross-section. The measuring chamber 5 comprises four pistons 6, arranged in side-by-side relationship, and three partition walls 7, each disposed between a pair of adjacent pistons 6. The pistons 6 and the partition walls 7 fill up the entire internal cross-sectional area of the measuring chamber 5.

Each partition wall 7, which is movable in the measuring chamber 5 in the same direction as the pistons 6, is provided with a locking pawl 9, movable up and down by means of a pin 8 projecting from the rear end of the partition wall, and with a recess 10 for receiving a pin 11 projecting laterally from an adjacent piston 6 (the right-hand one in FIG. 2).

In the position of the partition walls 7 as shown in FIG. 3, the latter are fixed relative to the measuring chamber 5 by the locking pawls 9 being pressed downwardly, by means of the respective pins 8, and into the respective bores 12 formed in the bottom wall of the measuring chamber 5, so that the measuring chamber is divided into four equally large measuring compartments 13. The associated piston 6 can reciprocate in each measuring compartment.

When the pistons 6 have been shifted so far (to the right in FIG. 3) that the laterally projecting pin 11 associated with the pistons is entirely received in the rear end of the adjacent partition wall 7, the partition walls 7 can be disengaged from the bottom of the measuring chamber 5, by moving the locking pawls 9 upwardly by means of the pin 8, and be coupled to the adjacent pistons 6 by locking the piston pins 11 in the recesses 10 of the partition walls. As a result the partition walls will be moved along with the pistons when the latter move back (to the left in FIG. 4) and vacate the entire internal space of the measuring chamber 5.

By coupling, at choice, one or more partition walls 7 with the pistons 6, the measuring chamber 5 can be divided into various measuring compartments 13 or, if the pistons and the partition walls reciprocate together, be entirely available for receiving dough supplied by the operative stroke of the piston 4.

The capacity of the measuring chamber 5 or the measuring compartments 13 is determined by arms 15, mounted on a shaft 14 (FIG. 1), which are jointly adjustable in the same position, and define the return stroke (to the left in FIG. 1) of the pistons 6.

After the measuring chamber 5 or the measuring compartments 13 have been filled with a predetermined quantity of dough, the measuring chamber with appurtenant parts, which is movable up and down, is moved downwardly to a position in which, by operating the shaft 14 and by means of the arms 15, the pistons 6 are simultaneously moved (to the right in FIG. 1), possibly together with the partition walls coupled to them, for driving the dough from the measuring chamber 5 or the measuring compartments 13, and delivering same to a conveyor belt 16, which carries the dough away for further processing.

The invention accordingly provides a simple dough dividing machine, which can extremely simply be adjusted for delivering dough pieces of different sizes.

It will be understood that the structural realization of the principle according to the invention leaves a great freedom. Thus, in deviation from the embodiment described, both the measuring chamber and the appropriate pistons can each be provided with a means for coupling, at choice, a partition wall to the measuring chamber or to a piston adjacent to the partition wall in a given position relative to each other.

I claim:
1. A dough dividing machine comprising a measuring chamber, a partition wall dividing said chamber into a plurality of measuring compartments, a piston reciprocating in each of said compartments, means for moving said partition wall in the same direction as said pistons, means for fixing said partition wall in said measuring chamber in a predetermined position, and each partition wall having locking means cooperating selectively with said measuring chamber and with an adjacent piston.

2. A dough dividing machine comprising a measuring chamber, a partition wall dividing said chamber into a plurality of measuring compartments, a piston reciprocating in each of said compartments, means for moving said partition wall in the same direction as said pistons, means for fixing said partition wall in said measuring chamber in a predetermined position, driving means for said pistons and means for selectively coupling said partition to said driving means or to said measuring chamber.

3. A dough dividing machine comprising a measuring chamber, a partition wall dividing said chamber into a plurality of measuring compartments, a piston reciprocating in each of said compartments, means for moving said partition wall in the same direction as said pistons, means for fixing said partition wall in said measuring chamber in a predetermined position, and means for selectively coupling said partition to an adjacent piston or to said measuring chamber.

References Cited

UNITED STATES PATENTS 1,826,031   10/1931   Streich.
1,871,261   8/1932   Eggert.

WALTER A. SCHEEL, Primary Examiner

A. O. HENDERSON, Assistant Examiner